(12) United States Patent
Freeman et al.

(10) Patent No.: US 11,326,474 B2
(45) Date of Patent: May 10, 2022

(54) TURBINE SHROUD ASSEMBLY WITH PINNED ATTACHMENT SUPPLEMENTS FOR CERAMIC MATRIX COMPOSITE COMPONENT MOUNTING

(71) Applicants: Rolls-Royce North American Technologies Inc., Indianapolis, IN (US); Rolls-Royce Corporation, Indianapolis, IN (US)

(72) Inventors: Ted J. Freeman, Danville, IN (US); Thomas Nixon, Brownsburg, IN (US); Jay Lane, Mooresville, IN (US); Aaron D. Sippel, Zionsville, IN (US); Robert F. Proctor, Carmel, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 81 days.

(21) Appl. No.: 16/703,378

(22) Filed: Dec. 4, 2019

(65) Prior Publication Data

US 2021/0172339 A1 Jun. 10, 2021

(51) Int. Cl.
  *F01D 25/24* (2006.01)
(52) U.S. Cl.
  CPC .......... *F01D 25/24* (2013.01); *F05D 2220/32* (2013.01); *F05D 2230/64* (2013.01); *F05D 2240/11* (2013.01); *F05D 2260/30* (2013.01); *F05D 2300/6033* (2013.01)
(58) Field of Classification Search
  CPC ...... F01D 25/24; F01D 25/243; F01D 25/246; F01D 11/122; F05D 2240/11; F05D 2260/30; F05D 2230/64; F05D 2300/6033; F05D 2220/32
  See application file for complete search history.

(56) References Cited

U.S. PATENT DOCUMENTS

| | | | |
|---|---|---|---|
| 2,727,716 A * | 12/1955 | Feilden | F01D 5/30 416/134 R |
| 4,500,255 A * | 2/1985 | Webb | F01D 5/225 415/189 |
| 6,821,085 B2 | 11/2004 | Darkins, Jr. et al. | |
| 6,877,952 B2 | 4/2005 | Wilson | |
| 7,546,743 B2 | 6/2009 | Bulman et al. | |
| 7,874,059 B2 | 1/2011 | Morrison et al. | |
| 9,976,746 B2 | 5/2018 | Bloom et al. | |
| 10,168,051 B2 | 1/2019 | Bloom et al. | |
| 2014/0271147 A1* | 9/2014 | Uskert | F01D 11/22 415/173.2 |
| 2016/0047549 A1 | 2/2016 | Landwehr et al. | |
| 2016/0161121 A1 | 6/2016 | Chang | |
| 2017/0044920 A1* | 2/2017 | Vetters | F01D 25/246 |

(Continued)

*Primary Examiner* — J. Todd Newton
*Assistant Examiner* — Jesse M Prager
(74) *Attorney, Agent, or Firm* — Barnes & Thornburg LLP

(57) ABSTRACT

A gas turbine engine includes a turbine shroud assembly with a carrier and a plurality of turbine shroud segments. Each turbine shroud segment includes a blade track segment and a mount assembly. The carrier is arranged to extend circumferentially at least partway around an axis. The blade track segment includes a shroud wall and a mount post that extends radially away from the shroud wall. The mount assembly is configured to couple the blade track segment with the carrier.

6 Claims, 6 Drawing Sheets

(56) References Cited

U.S. PATENT DOCUMENTS

| | | | |
|---|---|---|---|
| 2018/0340440 A1* | 11/2018 | Freeman | F01D 9/042 |
| 2018/0347816 A1 | 12/2018 | Dziech et al. | |
| 2018/0363502 A1 | 12/2018 | Dziech | |
| 2019/0112947 A1 | 4/2019 | Walston et al. | |
| 2019/0170013 A1 | 6/2019 | Tura | |
| 2019/0203611 A1 | 7/2019 | Stieg et al. | |
| 2019/0203939 A1 | 7/2019 | Stieg et al. | |
| 2020/0072082 A1* | 3/2020 | Jakomin | F01D 25/04 |

* cited by examiner

TURBINE SHROUD ASSEMBLY WITH PINNED ATTACHMENT SUPPLEMENTS FOR CERAMIC MATRIX COMPOSITE COMPONENT MOUNTING

FIELD OF THE DISCLOSURE

The present disclosure relates generally to gas turbine engines, and more specifically to turbine shrouds and other assemblies included in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products. In some examples, attachment of such components can present challenges.

SUMMARY

The present disclosure may comprise one or more of the following features and combinations thereof.

According to a first aspect of the present disclosure, a turbine shroud assembly for use with a gas turbine engine comprises a carrier, a blade track segment, and a mount assembly. The carrier may comprise metallic materials and is arranged to extend circumferentially at least partway around an axis. The carrier is formed to include a first pin-receiving aperture. The blade track segment may comprise ceramic matrix composite materials. The blade track segment may include a shroud wall and a mount post that extends radially away from the shroud wall. The mount post may be formed to include a second pin-receiving aperture that extends axially through the mount post.

In some embodiments, the mount assembly is configured to couple the blade track segment with the carrier. The mount assembly may include a replaceable grommet and an attachment pin. The replaceable grommet extends axially at least partway into the second pin-receiving aperture to fix the replaceable grommet with the mount post. The attachment pin is arranged within the first pin-receiving aperture and the grommet to couple the mount post of the blade track segment with the carrier so that the replaceable grommet provides a replaceable, sacrificial layer between the attachment pin and the mount post to reduce wear between the mount post and the attachment pin.

In some embodiments, the grommet comprises a material selected from at least one of a silicon-carbide based composite, an oxide-based composite, a monolithic ceramic, and a metallic base with a ceramic-compatible coating. The attachment pin may extend axially between a first end and a second end and has an outer surface that is continuously cylindrical and without threads from the first end to the second end.

In some embodiments, the grommet includes a body arranged in the second pin-receiving aperture formed in the mount post of the blade track segment and a flange that engages an axially-facing surface of the mount post of the blade track segment.

In some embodiments, the replaceable grommet has an inner diameter and the second pin-receiving aperture has an outer diameter, the inner diameter being greater than the outer diameter to provide an interference fit between the replaceable grommet and the mount post.

In some embodiments, the grommet has an outer surface with a non-circular cross-sectional shape and the second pin-receiving aperture has a shape that matches the outer surface of the grommet to block rotation of the grommet relative to the mount post. In some embodiments, the grommet further includes an anti-rotation tab and the second pin-receiving aperture is formed to include a complementary tab slot that receives the anti-rotation tab.

In some embodiments, the grommet extends through the second pin-receiving aperture and includes a body arranged in the second pin-receiving aperture, a flange engaged with an axially-facing surface of the mount post, and a grommet retainer. The body may have a plurality of threads opposite the flange and may be configured to receive the grommet retainer to clamp the mount post between the flange and the grommet retainer.

According to another aspect of the present disclosure, a mount assembly includes an attachment pin, a pin-retainer, and a spacer. The attachment pin arranged to extend through the second pin-receiving aperture and at least part way into the first pin-receiving aperture. The pin-retainer is coupled with the attachment pin and the spacer is arranged between the pin-retainer and the mount post.

In some embodiments, the mount assembly is configured to apply a load on the mount post to block movement of the mount post and the mount assembly relative to one another and reduce wear between the mount post and the mount assembly.

In some embodiments, the attachment pin includes a body that extends between first end and a second end, a flange coupled to the body between the first end and the second end, and a plurality of threads coupled to the body and engaged with the pin-retainer. The first end and the second end of the body may be arranged in the corresponding pin receiving apertures formed in the carrier to mount the blade track segment to the carrier.

In some embodiments, the pin-retainer is at least partially received in the first pin-receiving aperture. In some embodiments, the spacer includes a body that circumferentially around the attachment pin within the second pin-receiving aperture and a flange between the pin-retainer and the mount post outside of the second pin-receiving aperture. The flange may be conically shaped and may be configured to apply a load on the pin-retainer.

According to another aspect of the present disclosure, a method includes providing a carrier comprising metallic materials. The carrier may be formed to include a first pin-receiving aperture. The method may further include providing a blade track segment comprising ceramic matrix composite material. The blade track segment may include a shroud wall and a mount post that extends radially away from the shroud wall. The mount post may be formed to include a second pin-receiving aperture that extends axially through the mount post. In some embodiments, the method may further include coupling the blade track segment to the carrier with an attachment pin received in the first pin-receiving aperture and the second pin-receiving aperture.

In some embodiments, the method may further include damping movement of the attachment pin and the blade track segment relative to one another to reduce wear. The step of damping may include inserting a replaceable and sacrificial grommet into the second pin-receiving aperture between the attachment pin and the mount post to repair a damaged blade track segment if the second pin-receiving aperture is enlarged.

In some embodiments, the grommet may include a body portion arranged in the second pin-receiving aperture and a flange portion arranged axially between the mount post and the carrier outside of the second pin-receiving aperture. The body portion of the grommet may have a distal end that extends past the mount post outside of the second pin-receiving aperture and is threaded to receive a retainer. The step of damping may further include clamping the mount post between the flange portion and the retainer.

In some embodiments, the step of inserting the grommet into the second pin-receiving aperture includes cooling the grommet and heating the blade track segment so that the grommet may be inserted into the second pin-receiving aperture.

In some embodiments, the attachment pin includes a body that extends between first end and a second end, a flange coupled to the body between the first end and the second end and arranged outside of the second pin-receiving aperture, and a plurality of threads coupled to the body and engaged with a retainer. The step of damping may include clamping the mount post between the flange and the retainer.

In some embodiments, the step of damping further includes providing a spacer axially between the mount post and the retainer and applying a force on the retainer with the spacer.

These and other features of the present disclosure will become more apparent from the following description of the illustrative embodiments.

BRIEF DESCRIPTION OF THE DRAWINGS

FIG. 6 is a cross sectional view of another embodiment of a replaceable grommet with a shape that cooperates with the mount post to provide an anti-rotation feature;

FIG. 7 is a cross sectional view of another embodiment of a replaceable grommet with a tab that cooperates with a slot formed in the mount post to provide an anti-rotation feature;

DETAILED DESCRIPTION OF THE DRAWINGS

Figure 1:
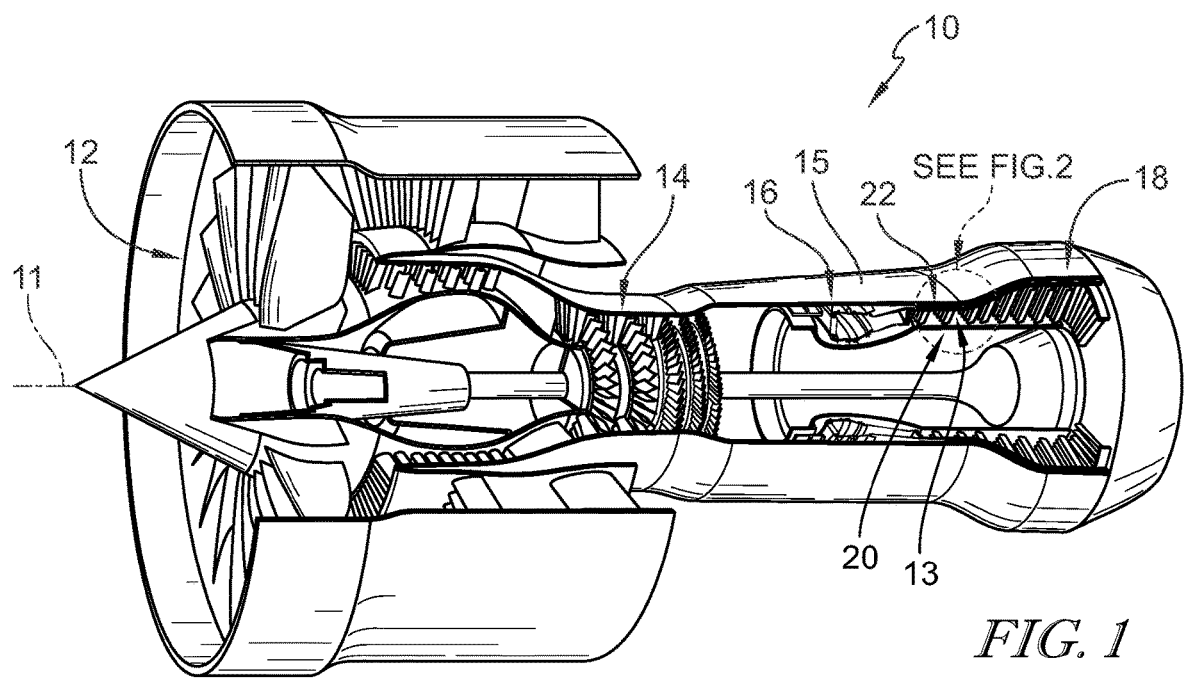
FIG. 1 is a cut-away perspective view of a gas turbine engine showing that the exemplary engine includes a fan driven by an engine core having a compressor, a combustor, and a turbine and suggesting the turbine includes a plurality of rotating wheel assemblies and turbine shrouds arranged around the rotating wheel assemblies.

For the purposes of promoting an understanding of the principles of the disclosure, reference will now be made to a number of illustrative embodiments illustrated in the drawings and specific language will be used to describe the same.

An illustrative gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 12.

Figure 2:
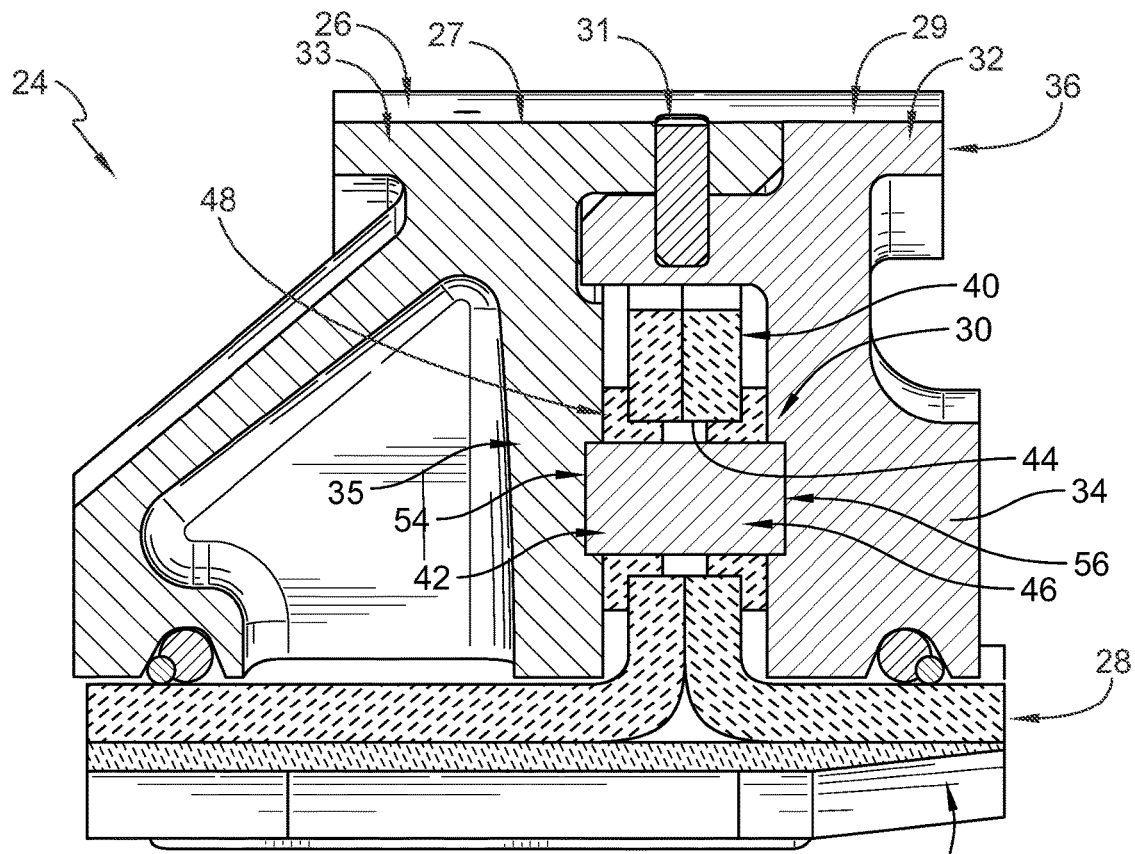
FIG. 2 is a cross-sectional view of one of the turbine shroud assemblies included in the turbine of FIG. 1 in accordance with the present disclosure showing that the turbine shroud assembly includes a carrier, a blade track segment, and a mount assembly configured to couple the blade track segment with the carrier, the mount assembly including an attachment pin and a replaceable grommet fitted between the attachment pin and the blade track segment to form a sacrificial layer that reduces wear between the attachment pin and the blade track segment.

The turbine 18 includes at least one turbine wheel assembly 20 and a turbine shroud assembly 22 positioned to surround the turbine wheel assembly 20 as shown in FIGS. 1 and 2. The turbine shroud assembly 22 is coupled to an outer turbine case 15 of the gas turbine engine 10. The turbine wheel assembly 20 includes a plurality of blades 13 coupled to a rotor disk for rotation therewith. The hot, high pressure combustion products from the combustor 16 are directed toward the blades 13 of the turbine wheel assemblies 20 along a flow path 17. The blades 13 are in turn pushed by the combustion products to cause the turbine wheel assembly 20 to rotate; thereby, driving the rotating components of the compressor 14 and/or the fan 12.

Figure 3:
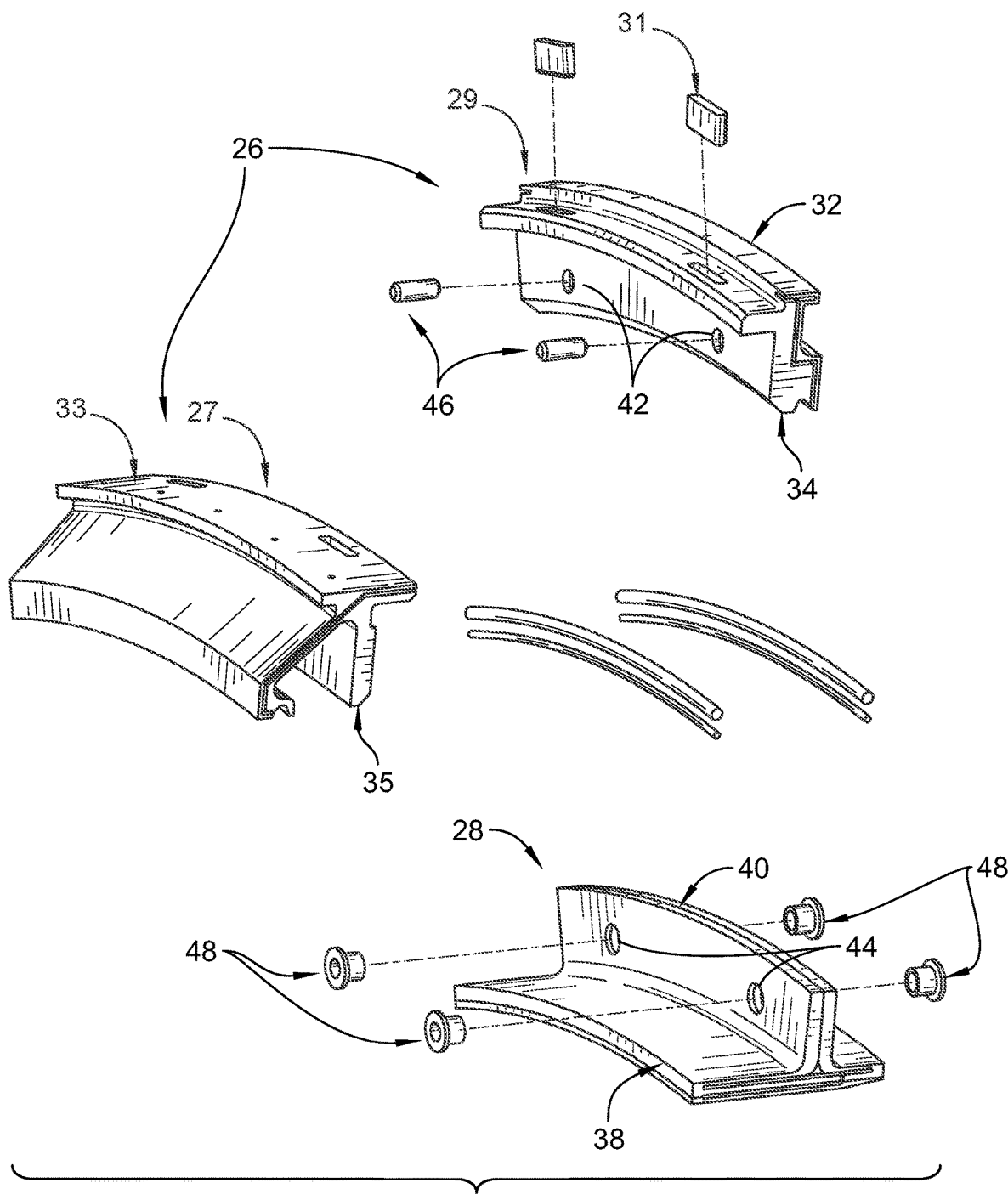
FIG. 3 is an exploded assembly view of the turbine shroud assembly from FIG. 2 showing the carrier, the blade track, and seals, and further showing that the blade track segment includes a shroud segment and a mount posts with a plurality of axially-extending apertures each arranged to receive an attachment pin and replaceable grommet to interlock the shroud segment with the carrier.

The turbine shroud assembly 22 extends around the turbine wheel assembly 20 to block combustion products from passing over the blades 13 without pushing the blades 13 to rotate as suggested in FIG. 2. In the illustrative embodiment, the turbine shroud assembly 22 is made up of a number of shroud segments 24, one of which is shown in FIGS. 2 and 3. Each shroud segment 24 extends circumferentially only part-way around the axis 11 and cooperates to surround the turbine wheel assembly 20. The shroud segments 24 are sealed against one another, such as by strip seal members, to provide a continuous turbine shroud assembly 22. In other embodiments, the turbine shroud assembly 22 is annular and non-segmented to extend fully around the axis 11 and surround the turbine wheel assembly 20. In yet other embodiments, certain components of the turbine shroud assembly 22 are segmented while other components are annular and non-segmented.

Each shroud segment 24 includes a carrier 26, a blade track segment 28, and a mount assembly 30 as shown in FIGS. 2 and 3. The carrier 26 is mounted in engine 10 and is configured to support the blade track segment 28 in position adjacent to the blades 13 of the turbine wheel assembly 20. The blade track segment 28 directly faces the blades 13 and interfaces with high temperature gases in the flow path 17. In some embodiments, there could be more than one blade track segment 28 per carrier 26. The mount assembly 30 is configured to couple the blade track segment 28 to the carrier 26 to position the blade track segment 28 in a predetermined location relative to the blades 13.

The carrier 26 illustratively comprises metallic materials and is arranged to extend circumferentially at least partway around the axis 11. The carrier 26 may be mounted to the turbine case 15 as shown in FIG. 1 to locate the carrier 26 and the blade track segment 28 relative to the axis 11. The carrier 26 includes an outer wall 32 and at least one attachment flange 34 that extends radially inward away from the outer wall 32 toward the axis 11. The outer wall 32 has one or more hangers 36 that engage the turbine case 15 to support the turbine shroud segment 24 relative to the turbine case 15. The attachment flange 34 cooperates with the mount assembly 30 to couple the blade track segment 28 to the carrier 26. In the illustrative embodiment shown in FIGS. 2 and 3, the carrier 26 includes a forward carrier member 27, an aft carrier member 29 separate from the forward carrier member 27, and mount pins 31 that extend radially inward through apertures formed in the forward carrier member 27 and the aft carrier member 29 to couple the forward carrier member 27 to the aft carrier member 29. The forward carrier member 27 and the aft carrier member 29 each include an outer wall 32, 33 and an attachment flange 34, 35 extending radially inward away from the outer wall 32, 33.

The blade track segment 28 illustratively comprises ceramic-matrix composite materials and is adapted to withstand high temperatures during operation of the gas turbine engine 10. The blade track segment 28 includes a shroud wall 38 and a mount post 40 that extends radially away from the shroud wall 38. The shroud wall 38 is arranged outward from the blades 13 and extends axially relative to the axis 11. A clearance gap may be provided between a radially inner surface of the shroud wall 38 and each of the blades 13 to allow the blades to rotate with minimum interference from the blade track segment 28. The mount post 40 cooperates with the mount assembly 30 and the attachment flange 34 to couple the blade track segment 28 to the carrier 26.

Figure 4:
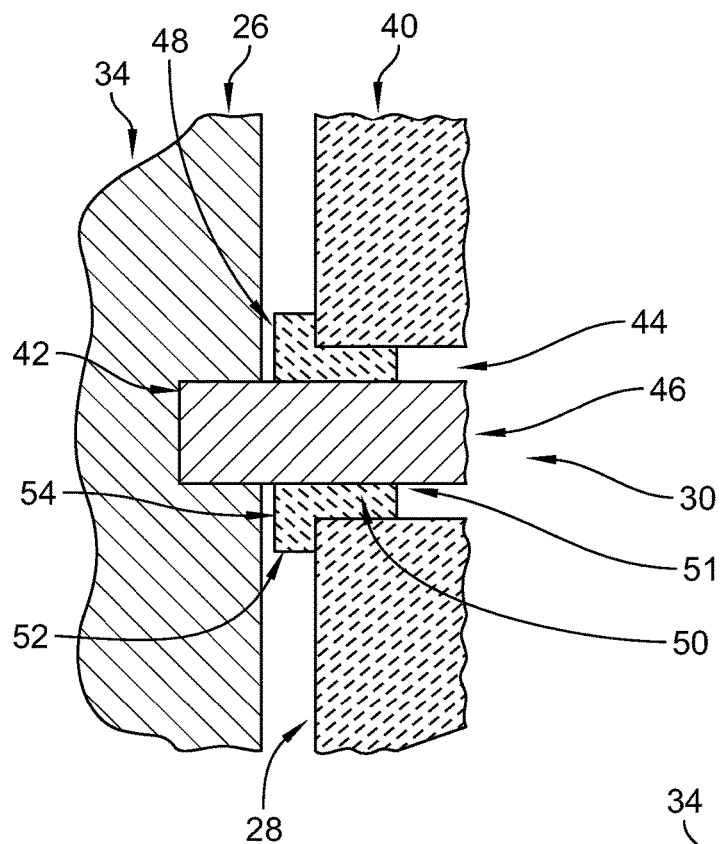
FIG. 4 is an enlarged sectional view of a first embodiment of the mount assembly showing the replaceable grommet positioned between the mount post of the blade track segment and the attachment pin to allow movement of the attachment pin relative to the mount post without damaging the mount post.

The attachment flange 34 is formed to include a first pin-receiving aperture 42 that extends axially into the attachment flange 34 as shown in FIGS. 3 and 4. The carrier 26 may include a plurality of attachment flanges and the first pin-receiving aperture 42 may extend into or through each of the attachment flanges. The mount post 40 is formed to include a second pin-receiving aperture 44 that extends axially through the mount post 40. A metallic attachment pin 46 is arranged within the first and second pin-receiving apertures 42, 44 to couple the blade track segment 28 to the carrier 26.

The carrier 26 and the attachment pin 46 have a different rate of thermal expansion from the blade track segment 28 due to the different materials that form each component. The metallic materials of the carrier 26 and the attachment pin 46 expand at a greater rate than the ceramic matrix composite materials of the blade track segment 28. These different rates of thermal expansion may cause undesirable binding stresses between the carrier and the blade track segment 28 and/or between the attachment pin 46 and the blade track segment 28. The binding stresses could cause wear and/or fretting of the blade track segment 28 and may lead to failure of the blade track segment 28.

The mount assembly 30 in the illustrative embodiment is configured to reduce wear and fretting of the blade track segment 28 caused by binding stresses between the carrier 26 and the blade track segment 28 and between the attachment pin 46 and the blade track segment 28. The mount assembly 30 includes the attachment pin 46 and at least one replaceable grommet 48 as shown in FIGS. 3 and 4. The replaceable grommet 48 is arranged at least partially within the second pin-receiving aperture 44 between the attachment pin 46 and the blade track segment 28. The replaceable grommet 48 provides a replaceable, sacrificial layer between the attachment pin 46 and the mount post 40 to reduce wear on the blade track segment 28.

In some embodiments, the replaceable grommet 48 may be inserted into the second pin-receiving aperture 44 to fill a gap between the attachment pin 46 and the blade track segment 28. The gap may be caused by wear between the blade track segment 28 and a pin such as attachment pin 46. This could enlarge the second pin-receiving aperture 44 and allow for undesirable movement of the blade track segment 28 relative to the carrier 26. The grommet 48 may also be used in instanced where the second pin-receiving aperture 44 is machined with an oversized diameter during manufacture of the blade track segment 28. Accordingly, the replaceable grommet 48 may be inserted between the attachment pin 46 and the blade track segment 28 to fill the gap and repair the blade track segment 28 without having to replace the blade track segment 28. The second pin-receiving aperture 44 may be machined prior to insertion of the grommet 48 so that the fit between the grommet 48 and the blade track segment 28 is even to accommodate the grommet 48 and allow for the repair.

In some embodiments, the replaceable grommet 48 is press fit into the second pin receiving aperture 44 of the blade track segment 28 to establish a friction-interference fit with the mount post 40 as suggested in FIG. 4. The friction interference fit is provided by sizing an outer diameter of the replaceable grommet 48 equal to or slightly larger than a diameter of the second pin-receiving aperture 44. The replaceable grommet 48 may be cooled during assembly to decrease an outer diameter of the replaceable grommet 48 so that it can be inserted into the second pin-receiving aperture 44. Alternatively or additionally, the blade track segment 28 may be heated during assembly to increase the diameter of the second pin-receiving aperture 44 so that the replaceable grommet 48 may be inserted therein. In other embodiments, the grommet 48 may be bonded, brazed, or threaded with the blade track segment 28.

In the illustrative embodiment, the replaceable grommet 48 comprises ceramic matrix composite materials. The ceramic matrix composite materials may include a silicon carbide, oxide, a monolithic ceramic, or any other suitable ceramic matrix composite material. In other embodiments, a metallic material may be used with a ceramic-compatible coating such as an aluminide coating. The ceramic-compatible coating is configured to reduce chemical reaction between the blade track segment 28 and the grommet 48.

The replaceable grommet 48 includes a body 50 arranged in the second pin-receiving aperture 44 and a flange 52 that extends outwardly from the body 50 as shown in FIG. 4. The body 50 engages the attachment pin 46 and is formed to include a pin aperture 51 that receives the attachment pin 46. The body 50 extends circumferentially around the attachment pin 46 to provide a barrier between the attachment pin 46 and the blade track segment 28. The barrier separates the metallic pin 46 from the ceramic blade track segment 28 to block chemical reactions between them. The flange 52 engages an axially-facing surface of the mount post 40 of the blade track segment 28. The flange 52 provides spacing between the mount post 40 and the attachment flange 34.

In the illustrative embodiment, the mount assembly 30 includes a pair of replaceable grommets 48 per attachment pin 46 as shown in FIG. 2. Each replaceable grommet 48 has a body 50 and a flange 52 as described above. The replaceable grommets 48 are positioned on opposite axial sides of the mount post 40 to provide spacing between the mount post 40 and the carrier 26 on each axial side.

The attachment pin 46 extends through the pin aperture 51 formed in each corresponding replaceable grommet 48 and engages the attachment flange 34 of the carrier 26 as shown in FIG. 2. The attachment pin 46 may be coupled with the replaceable grommet 48 with a friction-interference fit similar to the friction-interference fit between the replaceable grommet 48 and the blade track segment 28. The attachment pin 46 extends axially between a first end 54 and a second end 56 and has an outer surface 58 that is continuously cylindrical and without threads from the first end 54 to the second end 56. When fully assembled, the first end 54 and the second end 56 extend axially beyond the replaceable grommet 48 and are supported by the carrier 26.

The replaceable grommet 48 may deform as the carrier 26 and the attachment pin 46 grow thermally at a rate not equal to the blade track segment 28. The replaceable grommet 48 bears loads caused by these unequal thermal expansion rates to cushion the blade track segment 28 from the loads. The replaceable grommet 48 also dampens movement of the attachment pin 46 relative to the mount post 40. The replaceable grommet 48 may be removed and replaced without replacing the blade track segment 28 if the replaceable grommet 48 is damaged.

Figure 5:
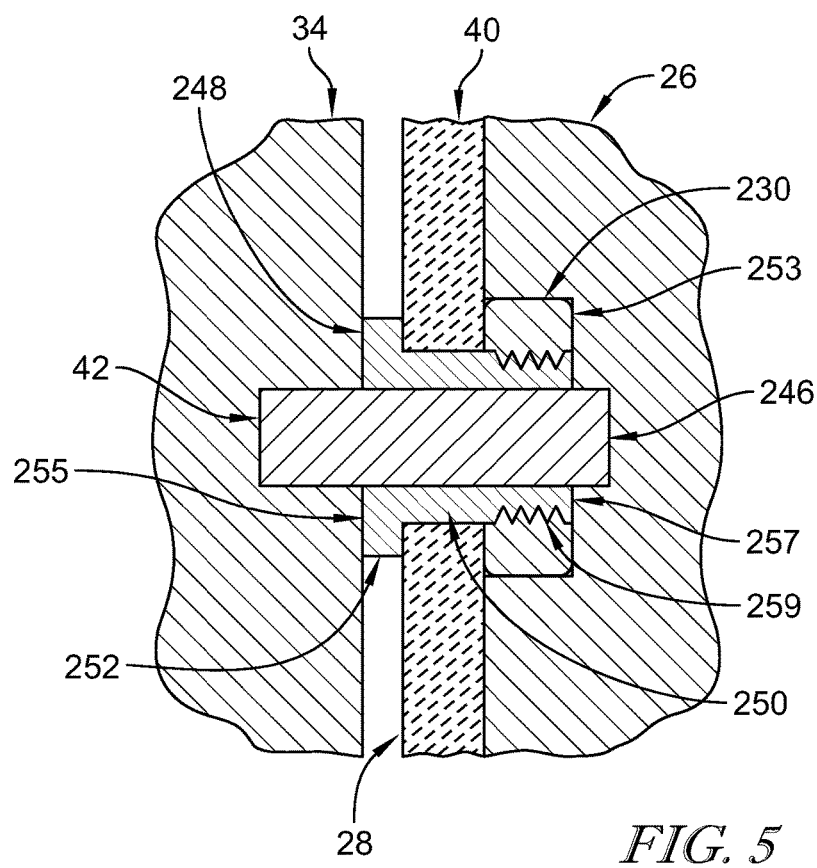
FIG. 5 is an enlarged sectional view of a second embodiment of a mount assembly including an attachment pin and a replaceable grommet between the attachment pin and the mount post and showing that the replaceable grommet extends axially aft of the mount post and is threaded and mated with a retainer to clamp the mount post between the replaceable grommet and the retainer.

Another embodiment of a mount assembly 230 in accordance with the present disclosure is shown in FIG. 5. The mount assembly 230 is adapted for use with the carrier 26 and the blade track segment 28. The mount assembly 230 includes an attachment pin 246, a replaceable grommet 248, and a grommet retainer 253. The attachment pin 246 is substantially similar to attachment pin 46. The replaceable grommet 248 provides a replaceable, sacrificial layer between the attachment pin 246 and the mount post 40 to reduce wear on the blade track segment 28.

The replaceable grommet 248 includes a body 250 and a flange 252 and extends axially from a first end 255 to a second end 257 as shown in FIG. 5. The body 250 extends axially through the second pin-receiving aperture 44 in the mount post 40. The flange 252 extends outwardly from the body 250 at the first end 255. The second end 257 protrudes past an axial surface of the mount post 40 and has threads 259. The threads 259 engage with the grommet retainer 253 to retain the replaceable grommet 248 to the mount post 40. The flange 252 of the replaceable grommet 248 and the grommet retainer 253 cooperate to apply a force on the mount post 40.

The mount assembly 230 clamps the mount post 40 between flange 252 and the grommet retainer 253 and supports the attachment pin 246 relative to the mount post 40. The attachment pin 246 is tied to the mount post 40 by the mount assembly 230 to block movement of the attachment pin 246 relative to the mount post 40. This reduces wear on the mount post 40 by limiting or damping movement of the attachment pin 246 relative to the mount post 40.

Figure 6:
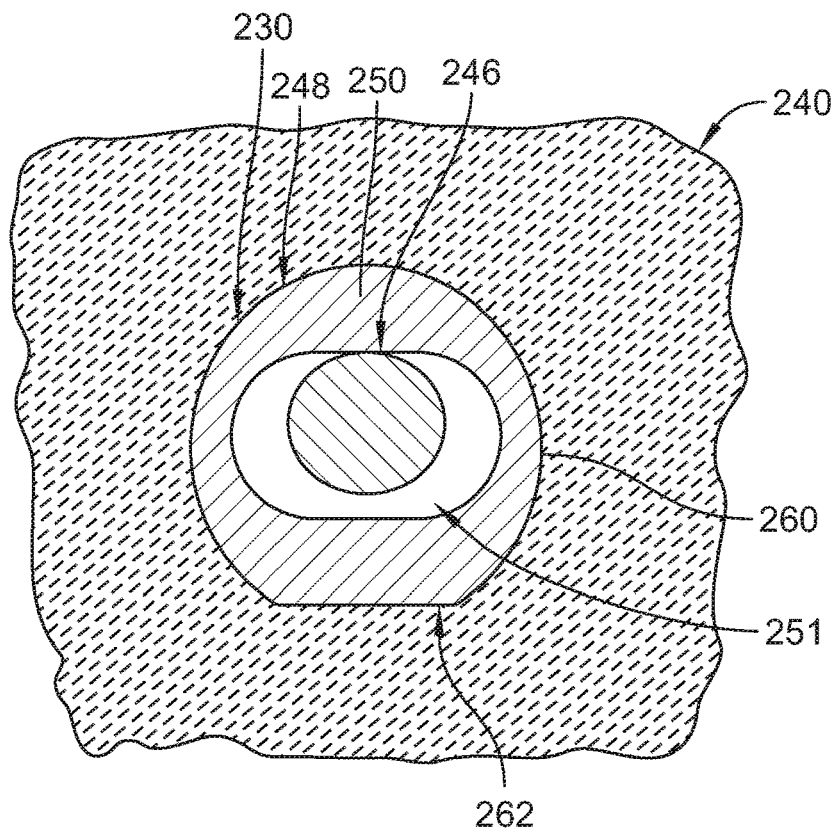
FIGS. 6 and 7 are cross sectional views looking at a mount assembly in the axial direction and showing several embodiments of replaceable grommets that are formed to include an elongated central aperture that extends in circumferential directions to accommodate movement of the attachment pin relative to the replaceable grommet and the mount post due to thermal growth mismatch.
Figure 7:
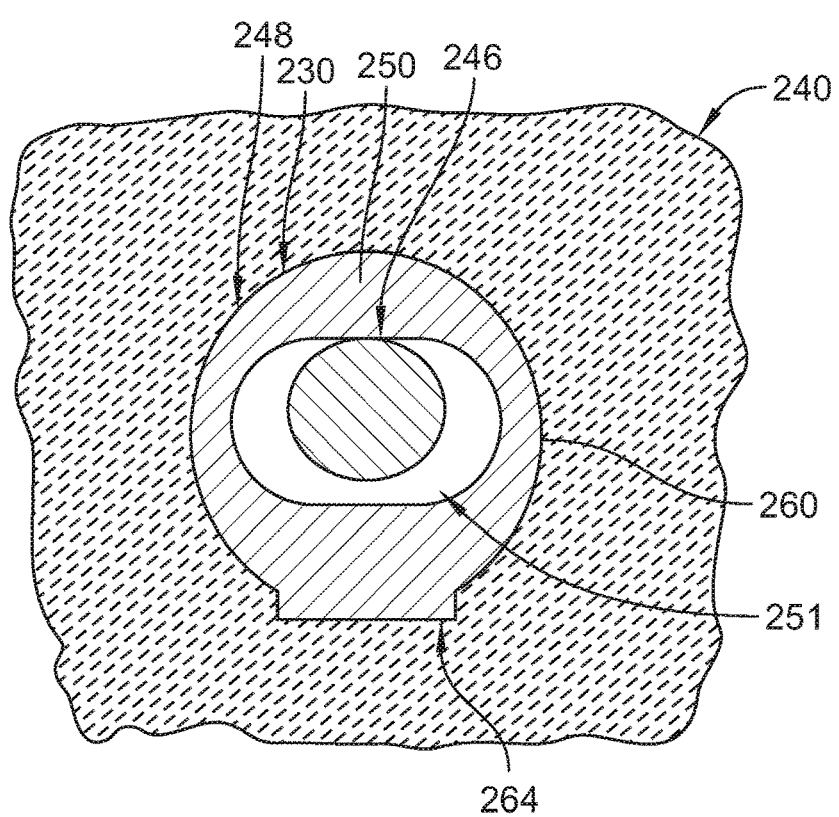

The pin aperture 51 of the replaceable grommets 48, 248 may be larger than a cross sectional area of the attachment pins 46, 246 as shown in FIGS. 6 and 7. Sizing the pin aperture 51 in this way may allow for movement of the attachment pin 46, 246 relative to the blade track segment 28 as the carrier 26 and the attachment pin 46, 246 grow at a rate that is faster than the blade track segment 28. The pin aperture 51 in the illustrative embodiment is elongated in circumferential directions relative to the axis 11 of the engine 10.

In some embodiments, the replaceable grommet 48, 248 may further include an anti-rotation feature to block the grommet from rotating relative to the mount post 240 as shown in FIGS. 6 and 7. The anti-rotation feature ensures that the pin aperture 251 is properly oriented to allow for movement of the attachment pins 46, 246 relative to the blade track segment 28 as described above.

The body 50, 250 of the replaceable grommet 48, 248 may include an outer surface 260 that cooperates with the second pin-receiving aperture 244 to provide a key-and-slot arrangement. For example, the body 50, 250 of the replaceable grommet 48, 248 may have a substantially circular cross-sectional shape that is interrupted by a cutout 262, as shown in FIG. 6, or a tab 264, as shown in FIG. 7. The pin-receiving aperture 244 is shaped to match the outer surface 260 of the replaceable grommet 48, 248 to block rotation of the replaceable grommet 48, 248 relative to the blade track segment 228.

Figure 8:
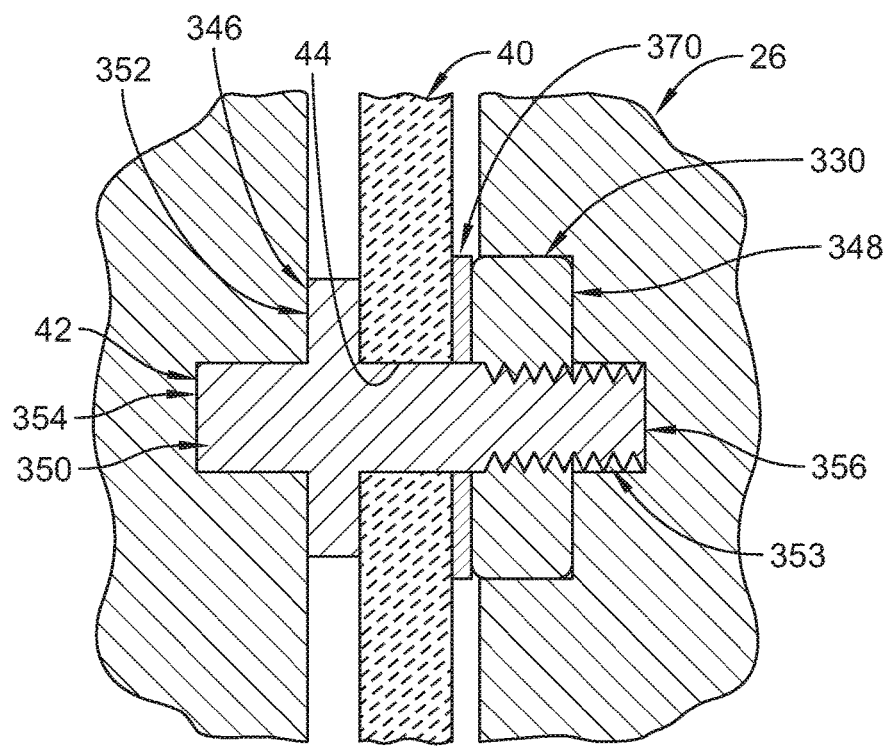
FIG. 8 is an enlarged cross sectional view looking in a circumferential direction of another embodiment of a mount assembly that includes an attachment pin with a flange and threads, a retainer mated with the threads, and a spacer positioned axially between the retainer and the mount post.

Another embodiment of a mount assembly 330 in accordance with the present disclosure is shown in FIG. 8. The mount assembly 330 is configured to couple the blade track segment 28 with the carrier 26 and includes an attachment pin 346, a pin-retainer 348, and a spacer 370. The attachment pin 346 is extends through the second pin-receiving aperture 44 and at least part way into the first pin-receiving aperture 42 to mount the blade track segment 28 to the carrier 26. The pin-retainer 348 is coupled with the attachment pin 346. The spacer 370 is arranged axially between the pin-retainer 348 and the mount post 40.

The mount assembly 330 is configured to apply a load on the mount post 40 to block movement of the mount post 40 and the mount assembly 330 relative to one another. This reduces wear on the mount post 40 by the attachment pin 346. The attachment pin 346 includes a body 350, a flange 352, and a plurality of threads 353 as shown in FIG. 8. The body 350 extends between a first end 354 and a second end 356. The flange 352 is coupled to the body 350 adjacent to the first end 354 and engages an axial surface of the mount post 40. The plurality of threads 353 are coupled to the body 350 adjacent to the second end 356 and are threadingly engaged with the pin-retainer 348.

In the illustrative embodiment, the first end 354 and the second end 356 of the body 350 are arranged in the first pin-receiving aperture 42 formed in the carrier 26 to mount the blade track segment 28 to the carrier 26 as shown in FIG. 8. The pin-retainer 348 may be least partially received in the first pin-receiving aperture 42 with the attachment pin 346. The spacer 370 is located axially between the mount post 40 and the pin-retainer 348. The pin-retainer 348 cooperates with the flange 352 of the attachment pin 346 to clamp the mount post 40 and the spacer 370 therebetween. This ties the mount assembly 330 and the blade track segment 28 together to block and/or dampen movement relative to one another.

Figure 9:
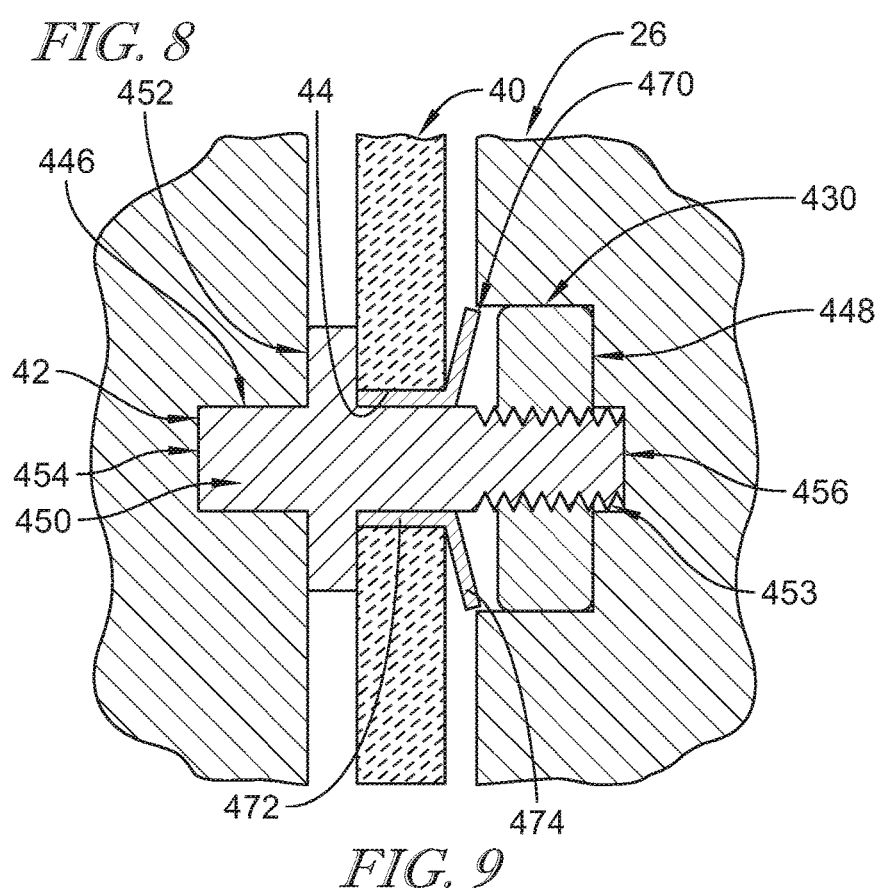
FIG. 9 is an enlarged cross sectional view of another embodiment of a mount assembly similar to the mount assembly shown in FIG. 8 including an attachment pin with a flange and threads, a retainer mated with the threads, and a spacer positioned axially between the retainer and the mount post that is configured to apply a bias force on the retainer.

Another embodiment of a mount assembly 430 in accordance with the present disclosure is shown in FIG. 9. The mount assembly 430 is configured to couple the blade track segment 28 with the carrier 26 and includes an attachment pin 446, a pin-retainer 448, and a spacer 470. The attachment pin 446 is extends through the second pin-receiving aperture 44 and at least part way into the first pin-receiving aperture 42 to mount the blade track segment 28 to the carrier 26. The pin-retainer 448 is coupled with the attachment pin 446. The spacer 470 is arranged axially between the pin-retainer 448 and the mount post 40.

The mount assembly 430 is configured to apply a load on the mount post 40 to block movement of the mount post 40 and the mount assembly 430 relative to one another. This reduces wear on the mount post 40 by the attachment pin 446. The attachment pin 446 includes a body 450, a flange 452, and a plurality of threads 453 as shown in FIG. 9. The body 450 extends between a first end 454 and a second end 456. The flange 452 is coupled to the body 450 adjacent to the first end 454 and engages an axial surface of the mount post 40. The plurality of threads 453 are coupled to the body 450 adjacent to the second end 456 and are threadingly engaged with the pin-retainer 448.

In the illustrative embodiment, the first end 454 and the second end 456 of the body 450 are arranged in the first pin-receiving aperture 42 formed in the carrier 26 to mount the blade track segment 28 to the carrier 26 as shown in FIG. 8. The pin-retainer 448 may be least partially received in the first pin-receiving aperture 42 with the attachment pin 446. The pin-retainer 448 cooperates with the flange 452 of the attachment pin 446 to clamp the mount post 40 and the spacer 470 therebetween. This ties the mount assembly 330 and the blade track segment 28 together to block and/or dampen movement relative to one another.

The spacer 470 includes a body 472 and a flange 474 as shown in FIG. 9. The body 472 extends circumferentially around the attachment pin 446 within the second pin-receiving aperture 44. The flange 474 extends between the pin-retainer 448 and the mount post 40 outside of the second pin-receiving aperture 44. The flange 474 is conically shaped and is configured to apply a load on the pin-retainer 448 to strengthen the connection between the mount assembly 430 and the blade track segment 28.

Figure 10:
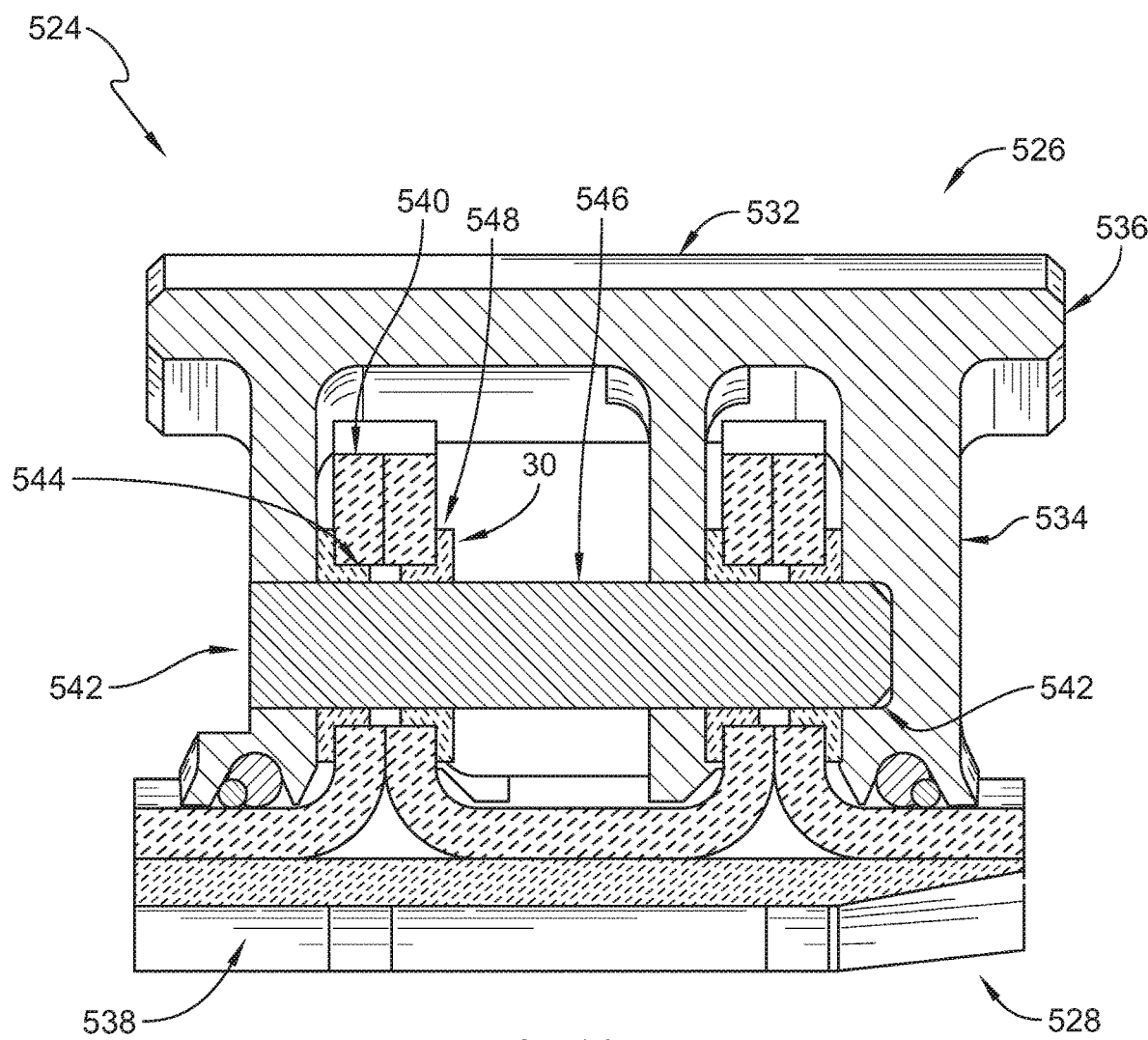
FIG. 10 is a cross sectional view of another embodiment of a turbine shroud assembly in accordance with the present disclosure showing that the turbine shroud assembly includes a mount system that is similar to the mount system shown in FIG. 2 and includes an attachment pin and at least one replaceable grommet.

Another embodiment of a turbine shroud segment 524 is shown in FIG. 10. Shroud segment 524 is similar to shroud segment 24 and includes a carrier 526, a blade track segment 528, and mount assembly 30 as shown in FIG. 10. The carrier 526 is mounted in engine 10 and is configured to support the blade track segment 528 in position adjacent to the blades 13 of the turbine wheel assembly 20. The blade track segment 528 directly faces blades 13 and interfaces with high temperature gases in the flow path 17. In some embodiments, there could be more than one blade track segment 528 per carrier 526. The mount assembly 30 is configured to couple the blade track segment 528 to the carrier 526 to position the blade track segment 528 in a predetermined location relative to the blades 13.

The carrier 526 illustratively comprises metallic materials and is arranged to extend circumferentially at least partway around the axis 11. The carrier 526 may be mounted to the turbine case 15 as shown in FIG. 1 to locate the carrier 526 and the blade track segment 528 relative to the axis 11. The carrier includes an outer wall 532 and at least one attachment flange 534 that extends radially inward away from the outer wall 532 toward the axis 11. The outer wall 532 is has one or more hangers 536 that engage the turbine case 15 to support the turbine shroud segment 524 relative to the turbine case 15. The attachment flange 534 cooperates with the mount assembly 530 to couple the blade track segment 528 to the carrier 526.

The blade track segment 528 illustratively comprises ceramic-matrix composite materials and is adapted to withstand high temperatures during operation of the gas turbine engine 10. The blade track segment 28 includes a shroud wall 538 and a mount post 540 that extends radially away from the shroud wall 538. The shroud wall 538 is arranged outward from the blades 13 and extends axially relative to the axis 11. A clearance gap may be provided between a radially inner surface of the shroud wall 538 and each of the blades 13 to allow the blared to rotate with minimum interference from the blade track segment 528. The mount post 540 cooperates with the mount assembly 530 and the attachment flange 534 to couple the blade track segment 528 to the carrier 526.

The attachment flange 534 is formed to include a first pin-receiving aperture 542 that extends axially into the attachment flange 534 as shown in FIG. 10. The mount post 540 is formed to include a second pin-receiving aperture 544 that extends axially through the mount post 540. The mount assembly 30 is configured to couple the blade track segment 528 to the carrier 526 in substantially the same manner as turbine shroud segment 24. The mount assembly 30 includes an attachment pin 546 and at least one replaceable grommet 548 as shown in FIG. 10. The replaceable grommet 548 is arranged at least partially within the second pin-receiving aperture 544 between the attachment pin 546 and the blade track segment 528. The replaceable grommet 548 provides a replaceable, sacrificial layer between the attachment pin 546 and the mount post 540 to reduce wear on the blade track segment 528.

In some embodiments, blade track segments may use a metallic pin to secure the blade track segment to the metallic carrier. This may be done by passing the metallic pin through a machined hole in the vertical leg (mount post) of blade track segment. In some embodiments, the metallic pin may cause abrasive/fretting wear of the blade track segment resulting in an enlargement of the machined hole. Alternatively, the fretting could cause wear in the pin. If the wear is excessive, this could result in the blade track segment becoming susceptible to premature failure.

In some embodiments, a replaceable insert (or grommet) may be placed into the hole in the blade track segment and can be replaced as shown in FIGS. 2-5. This insert may be selected from a group of materials that would limit the wear of the blade track segment. Potential materials for this insert would include SiC/SiC (silicon carbide/silicon carbide) ceramic matrix composite (CMC), an Ox/Ox (oxide/oxide) CMC, a monolithic ceramic or an applicable metal alloy. The insert may be replaced during engine overhaul and supports the re-use of the blade track segment.

In some embodiments, the grommet has an interference fit relative to the hole into which it is inserted. The actual interference fit could depend upon the difference in the coefficient of thermal expansion between the two materials. The interference fit may not be so tight that the stress in the blade track segment will cause failure at high temperatures. To insert the grommet, the base CMC is be heated (to increase the hole diameter) and the grommet chilled (to shrink the OD of the grommet) thus providing a clearance fit and the grommet can be inserted without having to mechanically press the grommet into the flange.

The present disclosure could also be employed as a repair methodology. For example, the grommet could be used to repair an oversized hole in the seal segment. The oversized whole could be enlarged as necessary to accommodate the grommet thus allowing the repair.

In some embodiments, one of the holes in the grommet machined as a circumferential slot as shown in FIGS. 6 and 7. This may include a rotational positioning feature to ensure that the grommet is installed in the desired orientation. This could be accomplished by making the hole in the blade track segment directionally slotted or by machining the hole in the grommet after it was installed in the blade track segment.

In some embodiments, a threaded pin, such as a Bellville washer or a nut may be used to limit the movement of the pin against the CMC thus preventing the abrasive wear of the pin against the CMC as shown in FIGS. 8 and 9. A threaded pin may pass through the holes in the vertical leg of the blade track segment which is then secured with a washer and nut to secure the pin in relation to the blade track segment and carrier as shown in FIG. 8. The washer may include an integral sleeve. The sleeve may be installed into the hole in the vertical leg of the blade track segment. The threaded pin with a flange may be installed thru the sleeve and secured in place with a nut as shown in FIG. 9.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly for use with a gas turbine engine, the turbine shroud assembly comprising a carrier comprising metallic materials and arranged to extend circumferentially at least partway around an axis, the carrier including an outer wall, a first attachment flange extending radially inwardly away from the outer wall, and a second attachment flange extending radially inwardly away from the outer wall and being spaced apart from the first attachment flange, the first attachment flange and the second attachment flange being formed to include a first pin-receiving aperture extending only partway through the first attachment flange and the second attachment flange and the first attachment flange and the second attachment flange are arranged to open and face axially toward one another, a blade track segment comprising ceramic matrix composite materials, the blade track segment including a shroud wall and a mount post that extends radially away from the shroud wall, the mount post arranged to lie axially between the first attachment flange and the second attachment flange and being formed to include a second pin-receiving aperture that extends axially through the mount post, and a mount assembly configured to couple the blade track segment with the carrier, the mount assembly including a first replaceable grommet coupled to an axially-forward side of the mount post, a second replaceable grommet coupled to an axially-aft side of the mount post, and an attachment pin, each replaceable grommet extends axially at least partway into the second pin-receiving aperture to fix each replaceable grommet with the mount post, and the attachment pin is arranged within the first pin-receiving aperture and each grommet to couple the mount post of the blade track segment with the carrier so that each replaceable grommet provides a replaceable, sacrificial layer between the attachment pin and the mount post to reduce wear between the mount post and the attachment pin, wherein the attachment pin extends axially between a first end and a second end and has an outer surface that is continuously cylindrical and without threads from the first end to the second end, and wherein the first replaceable grommet and the second replaceable grommet are each press-fit with the mount post and with the attachment pin to provide an interference fit between the each replaceable grommet and the mount post and between each replaceable grommet and the attachment pin.

2. The turbine shroud assembly of claim 1, wherein each replaceable grommet comprises a material selected from at least one of a silicon-carbide based composite, an oxide-based composite, a monolithic ceramic, and a metallic-based material with a ceramic-compatible coating.

3. The turbine shroud assembly of claim 1, wherein each replaceable grommet includes a body arranged in the second pin-receiving aperture formed in the mount post of the blade track segment and a flange that engages an axially-facing surface of the mount post of the blade track segment.

4. A turbine shroud assembly for use with a gas turbine engine, the turbine shroud assembly comprising a carrier comprising metallic materials and arranged to extend circumferentially at least partway around an axis, the carrier including a forward carrier member, an aft carrier member separate from the forward carrier member, and a mount pin that extends radially inward through apertures formed in the forward carrier member and the aft carrier member to couple the forward carrier member to the aft carrier member, the forward carrier member and the aft carrier member each comprising an outer wall and an attachment flange extending radially inward away from the outer wall, each attachment flange being formed to include a first pin-receiving aperture extending only partway through each attachment flange and arranged to open and face axially toward one another, a blade track segment comprising ceramic matrix composite materials, the blade track segment including a shroud wall and a mount post that extends radially away from the shroud wall, the mount post arranged to lie axially between the attachment flanges and being formed to include a second pin-receiving aperture that extends axially through the mount post, and a mount assembly configured to couple the blade track segment with the carrier, the mount assembly including a replaceable grommet and an attachment pin, the replaceable grommet extends axially at least partway into the second pin-receiving aperture to fix the replaceable grommet with the mount post and the attachment pin is arranged within the first pin-receiving aperture and the grommet to couple the mount post of the blade track segment with the carrier, wherein the attachment pin extends axially between a first end and a second end and has an outer surface that is continuously cylindrical and without threads from the first end to the second end, wherein the replaceable grommet has an inner surface engaged with the attachment pin and the inner surface has a constant diameter along an axial length of the replaceable grommet, and wherein the replaceable grommet is each press-fit with the mount post and with the attachment pin to provide an interference fit between the replaceable grommet and the attachment pin and between the replaceable grommet and the mount post.

5. The turbine shroud assembly of claim 4, wherein the grommet comprises a material selected from at least one of a silicon-carbide based composite, an oxide-based composite, a monolithic ceramic, and a metallic-based material with a ceramic-compatible coating.

6. The turbine shroud assembly of claim 4, wherein the grommet includes a body arranged in the second pin-receiving aperture formed in the mount post of the blade track segment and a flange that engages an axially-facing surface of the mount post of the blade track segment.

* * * * *